United States Patent
Thrush et al.

(10) Patent No.: US 8,985,350 B2
(45) Date of Patent: Mar. 24, 2015

(54) MODULAR OVERHEAD STORAGE

(71) Applicant: The Parallax Group International, LLC, San Juan Capistrano, CA (US)

(72) Inventors: Bruce Thrush, San Juan Capistrano, CA (US); John Grimm, Santee, CA (US)

(73) Assignee: The Parallax Group International, LLC, San Juan Capistrano, CA (US)

( * ) Notice: Subject to any disclaimer, the term of this patent is extended or adjusted under 35 U.S.C. 154(b) by 0 days.

(21) Appl. No.: 14/166,123

(22) Filed: Jan. 28, 2014

(65) Prior Publication Data

US 2014/0138333 A1     May 22, 2014

Related U.S. Application Data

(60) Division of application No. 12/974,801, filed on Dec. 21, 2010, now Pat. No. 8,657,130, which is a continuation-in-part of application No. 11/479,480, filed on Jun. 30, 2006, now abandoned.

(60) Provisional application No. 60/726,746, filed on Oct. 14, 2005, provisional application No. 60/697,468, filed on Jul. 7, 2005.

(51) Int. Cl.
*A47F 5/08*         (2006.01)
*A47B 43/00*      (2006.01)
(Continued)

(52) U.S. Cl.
CPC ............... *A47F 5/08* (2013.01); *D06F 57/125* (2013.01); *A47B 45/00* (2013.01); *E04B 9/18* (2013.01); *A47F 5/0892* (2013.01); *A47B 96/025* (2013.01); *A47B 57/44* (2013.01)
USPC ........... 211/117; 211/175; 248/327; 248/343; 108/42

(58) Field of Classification Search
CPC ....... D06F 81/06; D06F 57/125; D06F 57/12; A47B 96/02; A47B 5/00; A47B 43/006; A47B 43/003; A47B 45/00; A47B 96/025; A47B 57/30; A47B 57/44; A47B 57/48; E04B 9/006; E04B 9/18; E04B 9/20; F21V 21/02; F16M 13/027; F16M 13/02; F16M 11/041; A47F 5/0892; A47F 5/10; A47F 5/13; A47F 5/0876; A47F 5/0807; A47F 5/01; A47G 25/743; C25D 17/08; A22C 15/007
USPC ......... 211/117, 175, 119, 113, 208, 118, 189, 211/207, 181.1, 135; 108/48, 42, 149, 186, 108/57.25, 64, 65, 182, 185; 52/39; 248/317, 323, 326, 327, 343; 312/245, 312/246
See application file for complete search history.

(56) References Cited

U.S. PATENT DOCUMENTS

| 276,241 A | 4/1883 | Hanavan |
|---|---|---|
| 923,089 A | 5/1909 | Tedesco |

(Continued)

*Primary Examiner* — Jennifer E Novosad
(74) *Attorney, Agent, or Firm* — Fish & Tsang LLP

(57) ABSTRACT

A storage system comprises a rack of multiple platforms connectable to one another in a first direction, where each of the platforms has segments that connect to one another along a direction other than the first direction, via a user-operable coupling. The platforms are preferably rectangular, and are connected at their long ends. The segments of each platform are also preferably rectangular, but they are connected along their long sides. In such embodiments, the connection between platforms is perpendicular to the length of the rack, while the connection between segments is parallel to the length of the rack. The segments of individual platforms are preferably coupled together with snap fit connections, and supported from their undersides by transverse supports, and the transverse supports are supported from their undersides by longitudinal supports via recesses on the segments. The transverse supports are preferably perpendicular to the longitudinal supports.

18 Claims, 6 Drawing Sheets

(51) Int. Cl.
  *A47B 47/00* (2006.01)
  *A47B 57/00* (2006.01)
  *D06F 57/12* (2006.01)
  *A47B 45/00* (2006.01)
  *A47B 96/02* (2006.01)
  *A47B 57/44* (2006.01)
  *E04B 9/18* (2006.01)

(56) References Cited

U.S. PATENT DOCUMENTS

| | | |
|---|---|---|
| 1,260,123 A | 3/1918 | Abeson |
| 1,393,054 A | 10/1921 | Turner |
| 1,566,551 A | 12/1925 | Ma Ghrand |
| 1,645,179 A | 10/1927 | Bunyan |
| 2,057,092 A | 10/1936 | Geib |
| 2,582,385 A | 1/1952 | Knudsen |
| 2,587,150 A | 2/1952 | Hansen et al. |
| 2,645,358 A | 7/1953 | Moore et al. |
| 2,670,917 A | 3/1954 | Hoffman |
| 2,767,513 A | 10/1956 | Bluestone |
| 3,139,045 A | 6/1964 | Rojakovick |
| 3,158,113 A | 11/1964 | Johnson |
| 3,313,424 A | 4/1967 | Gingher |
| 3,513,786 A | 5/1970 | Kellogg |
| 3,665,777 A | 5/1972 | Jensen |
| 3,695,457 A | 10/1972 | Cohen |
| 3,735,951 A | 5/1973 | Reed |
| 3,749,252 A | 7/1973 | Buschen |
| 3,832,957 A | 9/1974 | Mendenhall |
| 3,945,462 A | 3/1976 | Griswold |
| 3,978,988 A | 9/1976 | Friedeberg |
| 4,325,486 A | 4/1982 | Neal |
| 4,424,908 A | 1/1984 | Davitz |
| 4,441,583 A | 4/1984 | Vaught |
| 4,620,612 A | 11/1986 | Enoki et al. |
| 5,351,926 A | 10/1994 | Moses |
| 5,520,316 A | 5/1996 | Chen |
| 5,556,064 A | 9/1996 | Cowe |
| 5,617,931 A | 4/1997 | Zygmun et al. |
| 5,692,762 A | 12/1997 | Obitts |
| 5,860,369 A | 1/1999 | John et al. |
| 5,873,556 A | 2/1999 | Reiker |
| 5,946,875 A | 9/1999 | Jeanseau |
| D416,152 S | 11/1999 | Payne et al. |
| 6,070,383 A | 6/2000 | Jeanseau |
| 6,085,668 A | 7/2000 | Kanki |
| 6,145,678 A | 11/2000 | Morrison |
| 6,155,440 A | 12/2000 | Arce |
| 6,161,709 A | 12/2000 | Kluge et al. |
| 6,257,425 B1 | 7/2001 | Liu |
| 6,263,807 B1 | 7/2001 | Fox et al. |
| 6,311,626 B1 | 11/2001 | Roberts |
| 6,401,945 B1 | 6/2002 | Gawel |
| 6,409,031 B1 | 6/2002 | Wynne |
| D459,926 S | 7/2002 | Mikich et al. |
| 6,435,105 B1 | 8/2002 | Mikich et al. |
| 6,439,405 B1 | 8/2002 | Hanneken |
| D470,353 S | 2/2003 | Mikich et al. |
| D477,957 S | 8/2003 | Mikich et al. |
| 6,715,427 B2 | 4/2004 | Mikich et al. |
| 6,725,608 B1 | 4/2004 | Kraus |
| D525,811 S | 8/2006 | Nawrocki |
| D526,519 S | 8/2006 | Nawrocki |
| 7,124,903 B2 | 10/2006 | Gruber et al. |
| 7,152,535 B2 | 12/2006 | Mikich et al. |
| 7,188,817 B2 | 3/2007 | Henning |
| 7,228,669 B1 | 6/2007 | Yaraschefski |
| D559,090 S | 1/2008 | Nawrocki |
| 7,357,262 B2 | 4/2008 | Fratilla |
| 7,421,957 B2 | 9/2008 | Baez |
| 7,445,188 B2 | 11/2008 | Lamparter |
| 7,543,538 B2 | 6/2009 | Baez |
| 7,810,438 B2 | 10/2010 | Ryberg |
| 8,066,131 B2 | 11/2011 | Mansor |
| 8,657,130 B2 * | 2/2014 | Thrush et al. .................. 211/117 |
| 2002/0023888 A1 | 2/2002 | Wynne et al. |
| 2002/0043189 A1 | 4/2002 | Mikich et al. |
| 2002/0104812 A1 | 8/2002 | Robichaux |
| 2004/0182291 A1 | 9/2004 | Mikich et al. |
| 2005/0188903 A1 | 9/2005 | Ryberg |
| 2006/0070967 A1 | 4/2006 | Schaubeck et al. |
| 2007/0007223 A1 | 1/2007 | Thrush et al. |
| 2007/0062896 A1 | 3/2007 | Richardson et al. |
| 2007/0119805 A1 | 5/2007 | Nawrocki |
| 2007/0205169 A1 | 9/2007 | Fratilla |
| 2007/0241070 A1 | 10/2007 | Maheu et al. |

\* cited by examiner

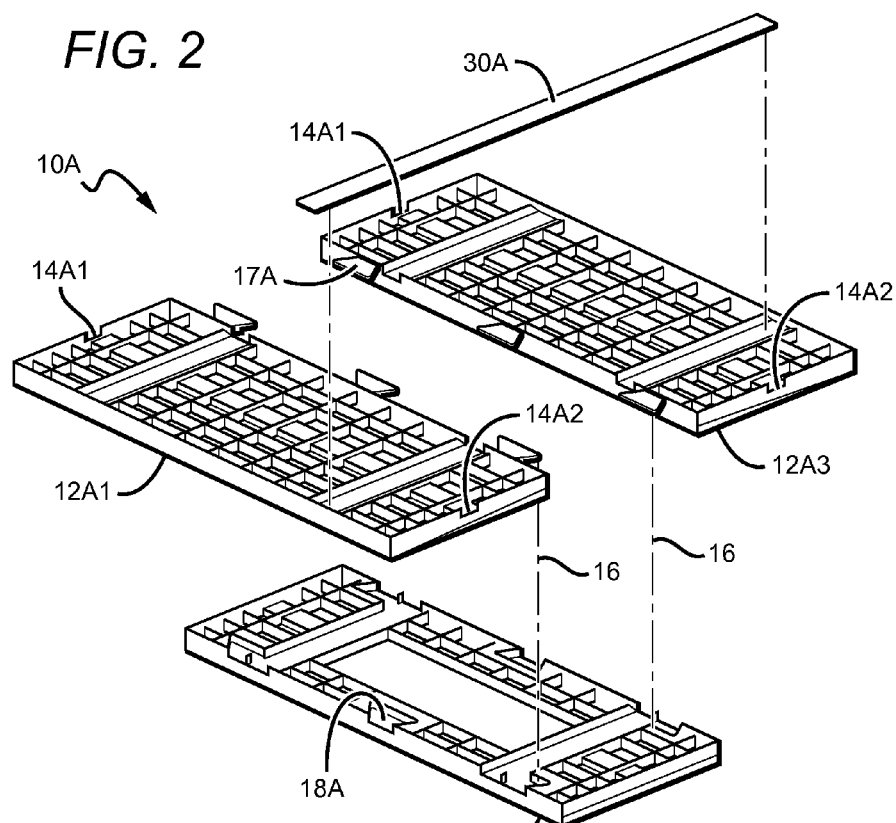
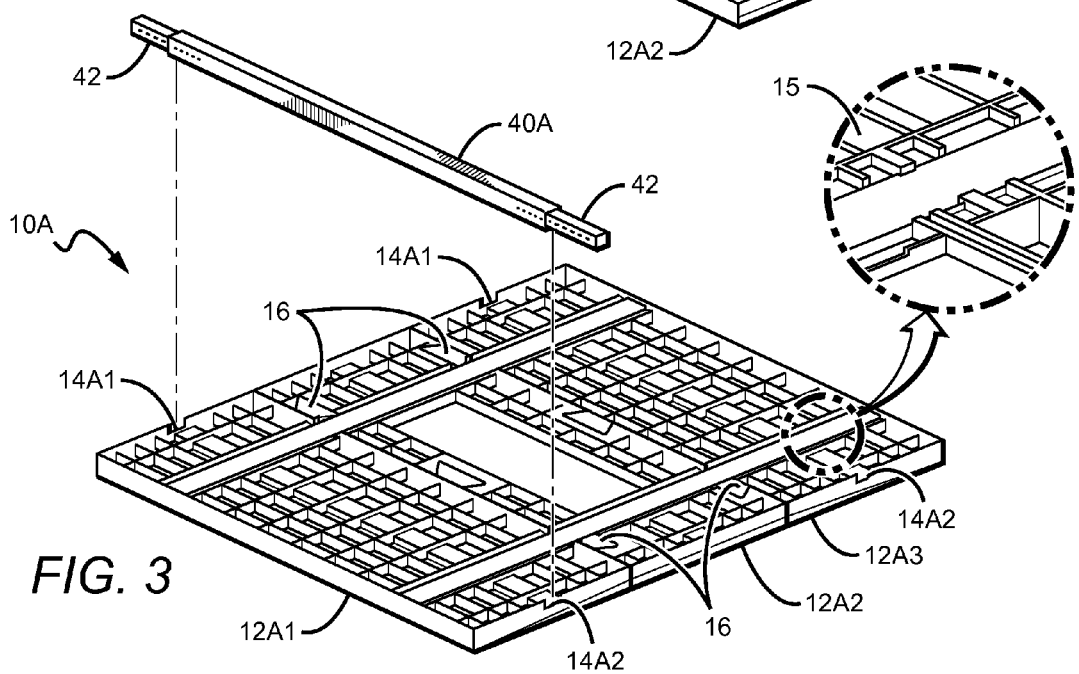

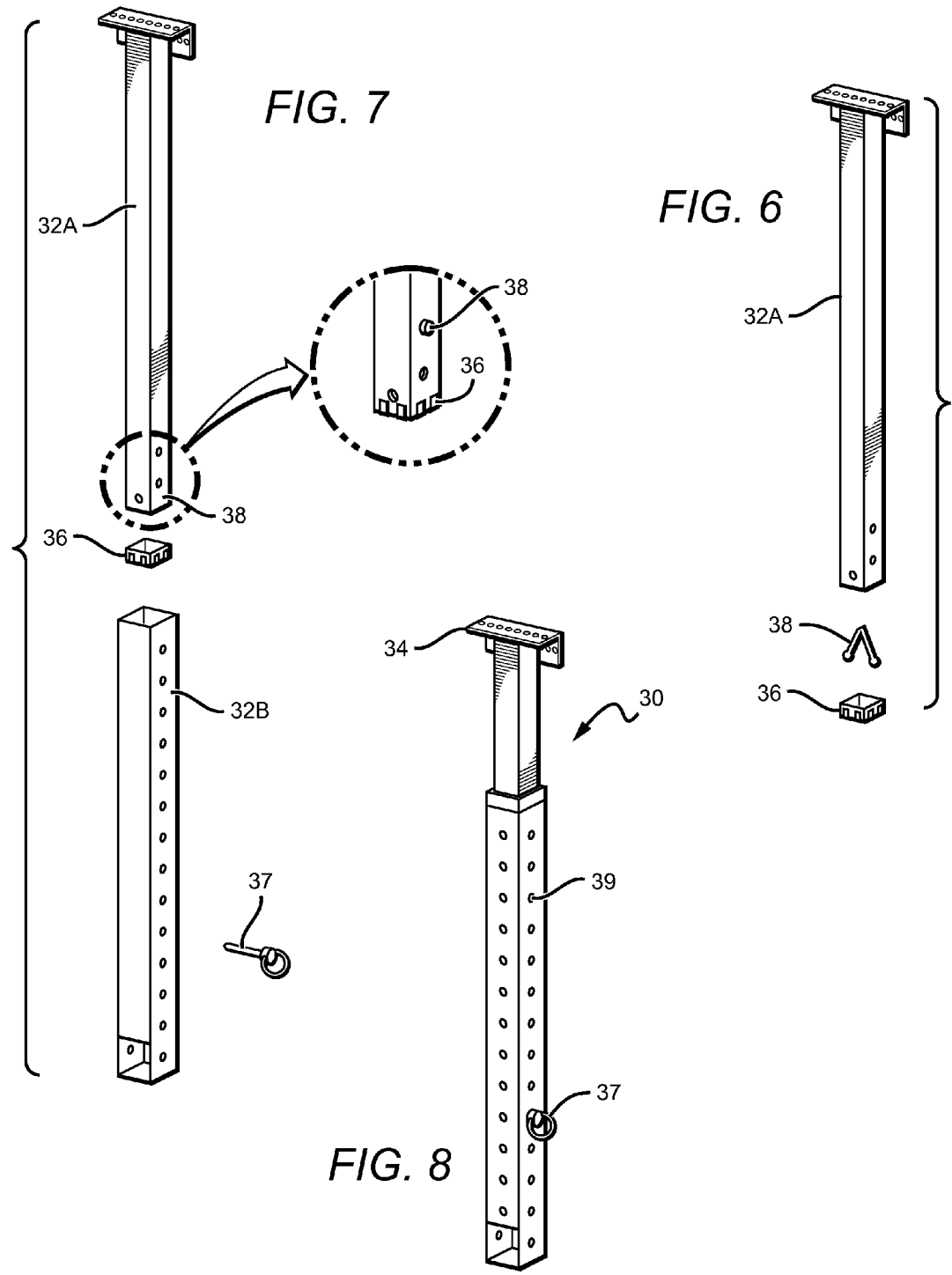

MODULAR OVERHEAD STORAGE

This application is a divisional of U.S. patent application Ser. No. 12/974,801 filed on Dec. 21, 2010, which is a continuation-in-part and claims priority to U.S. patent application Ser. No. 11/479,480 filed Jun. 30, 2006, which claims the benefit of U.S. Provisional Application No. 60/697,468 filed Jul. 7, 2005 and U.S. Provisional Application No. 60/726,746 filed Oct. 14, 2005. These and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is overhead suspension storage racks.

BACKGROUND

Many different types of overhead storage racks are known. Overhead storage racks are typically hung from the ceiling to provide storage space where space is at a premium, such as a garage.

One problem with known storage racks, whether overhead or floor supported, is that the width is limited to that of a single plank, platform, or other member. See, e.g., U.S. Pat. No. 1,260,123 to Areson, U.S. Pat. No. 3,832,957 to Mendenhall, U.S. Pat. No. 6,725,608 to Kraus, and U.S. Pat. No. 7,152,535 to Mikich et al. This causes wholesalers and retailers to stock several different widths to accommodate different user demands, which in turn consumes valuable floor and storage space, and requires higher inventory costs.

Thus, there is still a need for modular overhead storage racks that are relatively compact, allowing desirable retail packing, and assembles easily.

SUMMARY OF THE INVENTION

The present invention provides apparatus, systems and methods in which a storage system comprises a rack of multiple platforms connectable to one another in a first direction, where each of the platforms has segments that connect to one another along a direction other than the first direction, via a user-operable coupling.

In a preferred embodiment, the platforms are rectangular, and are connected at their long ends. The segments of each platform are also rectangular, but they are connected along their long sides. In such embodiments, the connection between platforms is perpendicular to the length of the rack, while the connection between segments is parallel to the length of the rack. The segments of individual platforms are preferably coupled together with snap fit connections, and supported from their undersides by transverse supports, and the transverse supports are supported from their undersides by longitudinal supports. The transverse supports are preferably perpendicular to the longitudinal supports.

Each of the platform has end segments that have a series of recesses on its underside. The recesses are to couple a respective segment of a portion of the longitudinal support beams or an adjuster of the longitudinal support beams so said portion of the support beams is embedded into the recesses.

Adjacent platforms can be coupled in any suitable manner, including at the ends of the longitudinal supports. Adjacent platforms may, but need not touch one another.

Each of the platforms in the rack can advantageously be supported from above by one, two, or more pairs of legs. Legs can alternatively or additionally be disposed between the platforms. Preferred legs are telescoping, allowing easy adjustment of their lengths. It is further contemplated that the telescoping mechanism can have a finger operable detent that cooperates with a catch to fix the length until the user can insert a secure pin.

In another aspect, a polymeric ring can be advantageously positioned at an end of one of the telescoping components of a leg to reduce noise and vibration. Similarly, polymeric rings can be placed at the ends of the longitudinal supports.

Various objects, features, aspects and advantages of the present invention will become more apparent from the following detailed description of preferred embodiments of the invention, along with the accompanying drawings in which like numerals represent like components.

BRIEF DESCRIPTION OF THE DRAWING

FIG. 2 is an exploded perspective view a platform of FIG. 1.

FIG. 3 is non-exploded view of the platform of FIG. 2.

FIG. 6 is an exploded perspective view of a telescoping member of a leg showing a detent and a polymeric ring.

FIG. 7 is a exploded perspective view of a leg

FIG. 8 is a non-exploded perspective view of the leg of FIG. 7.

DETAILED DESCRIPTION

Figure 1:
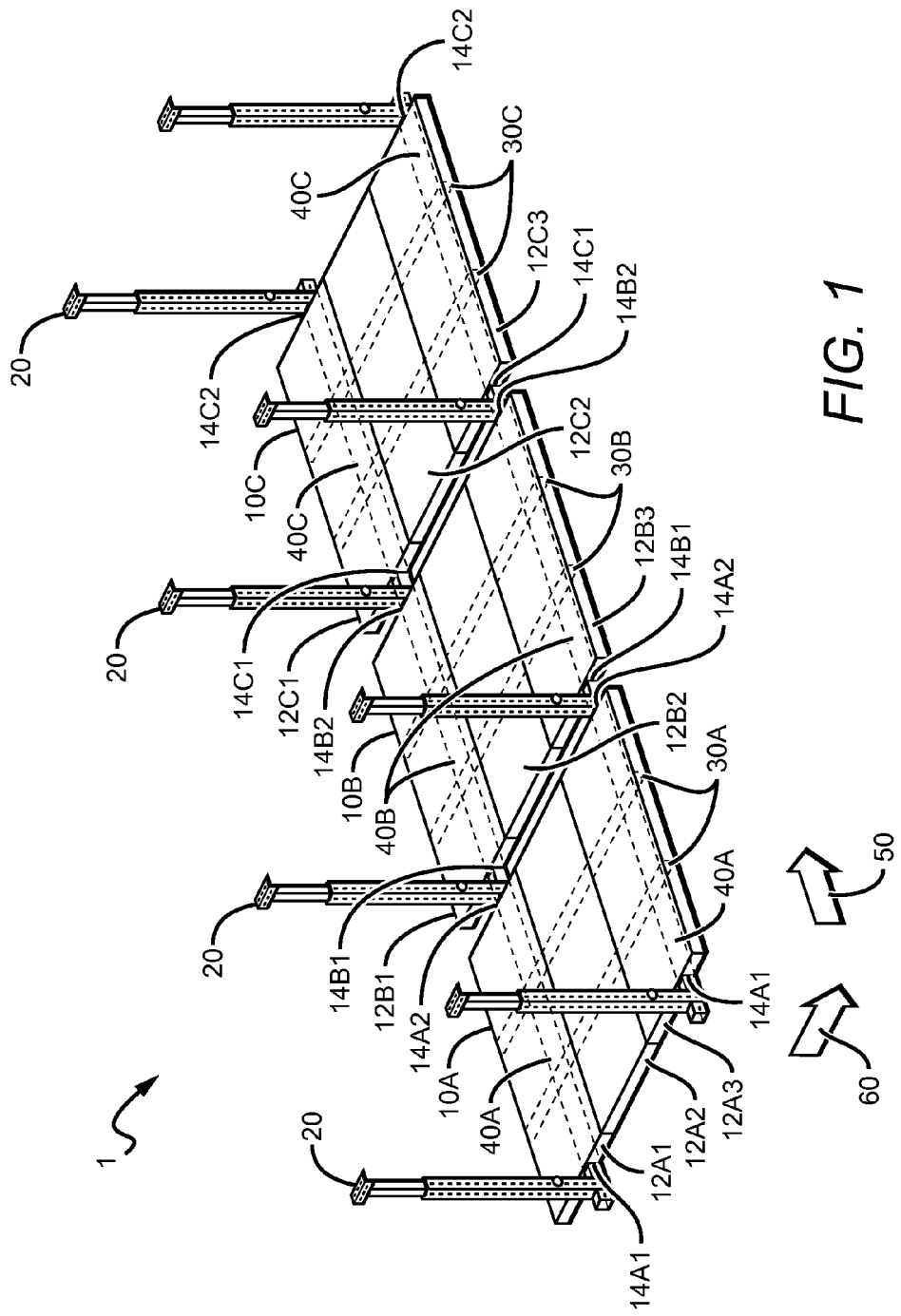
FIG. 1 is a perspective view of a storage rack having three platforms.
Figure 4:
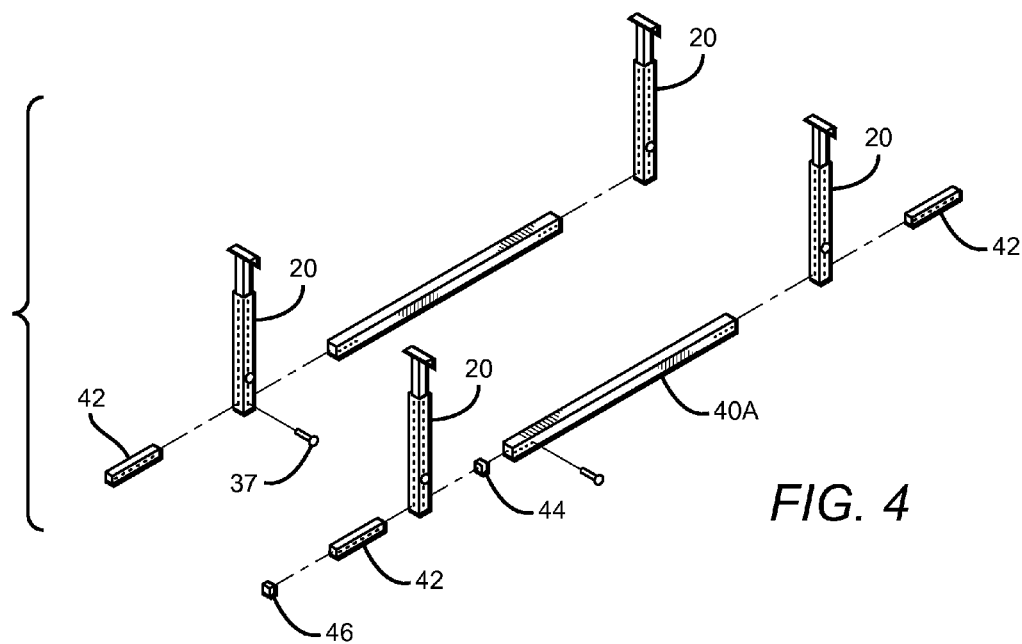
FIG. 4 is an exploded perspective view of a pair of longitudinal supports, and corresponding pairs of legs.
Figure 5:
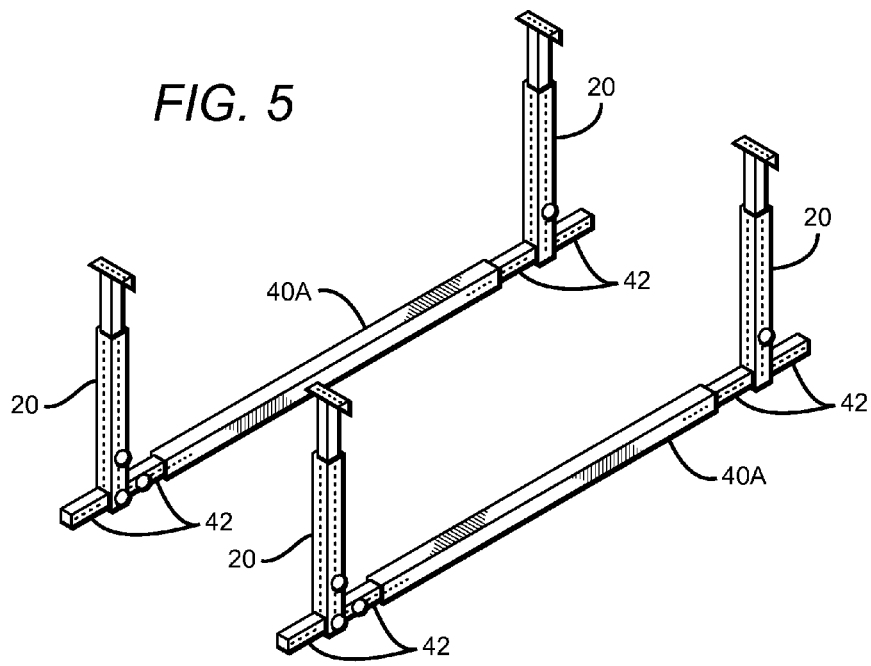
FIG. 5 is a non-exploded perspective view of the pair of longitudinal supports, and corresponding pairs of legs of FIG. 4.

In FIG. 1, a storage rack 1 generally includes platforms 10A, 10B, and 10C, and legs 20. Each of the platforms 10A, 10B, and 10C comprises three segments 12A1-12A3 for platform 10A, 12B1-12B3 for platform 10B, 12C1-12C3 for platform 10C. There is a pair of transverse supports 30A-30C underneath each of the platforms, and two longitudinally oriented supports 40A-40C beneath each of the pairs of transverse supports 30A-30C, respectively. The platforms 10A, 10B, and 10C are coupled together at the ends of the longitudinally oriented supports 40A-40C via a series of recesses 14A1-14A2 for segments 12A1 and 12A3, recesses 14B1-14B2 for segments 12B1 and 12B3, 14C1-14C2 for segments 12C1 and 12C3, respectively, and held from above using legs 20.

It should be apparent from FIG. 1 that the various platforms are connected to one another in a first direction 50, whereas each of the platforms has segments that connect to one another along a second direction 60, which is not only different from the first direction 50 but perpendicular to the first direction 50.

Those skilled in the art will immediately appreciate that rack 1 can be extended or reduced in length by adding or removing platforms. Rack 1 can also be extended or reduced in width by adding or reducing the number of segments in the different platforms. It should even be possible to have a rack with platforms having different lengths and different widths. For adjacent segments having different widths, the longitudinal supports may be coupled using a zigzag connector. It should also be appreciated that the legs on the racks disclosed herein could stand on the floor, or that a side-connecting mechanism could be used to hang a rack on a wall.

Platforms can comprise any suitable material or materials, including, for example, metal, polymers, and so forth. In a preferred embodiment the segments of the platforms are made of lightweight plastic, wire mesh, wood, or any other suitable material. Further, the platforms can have suitable size and configuration, including especially configurations that are sized and dimensioned to accommodate standard cardboard banker's boxes.

In FIGS. 2 and 3 platform 10A comprises three segments 12A1-12A3. These segments are shown as being substantially rectangular, but can alternatively have any suitable shape, including for example, square, triangular, or having straight ends and curved or waved sides. Each segment can have any suitable width, but preferably none of the segments is more than 40% of the broadest width of the platform, and more preferably none is more than 30% of the broadest width of the platform. From a marketing standpoint it is desirable for the various segments to be sized and dimensioned for convenient packaging, storage, and transportation.

Segments 12A1-12A3 are shown as having a lattice structure, which is relatively lightweight and is suitable for holding boxes, bags, and so forth. Other structures are also contemplated, including for example, structures with a solid top such as can be constructed using blow-molded plastic with internal baffles. Such structures can be advantageous in that they would prevent a spilled or leaked liquid from flowing down from the platform.

Figure 9:
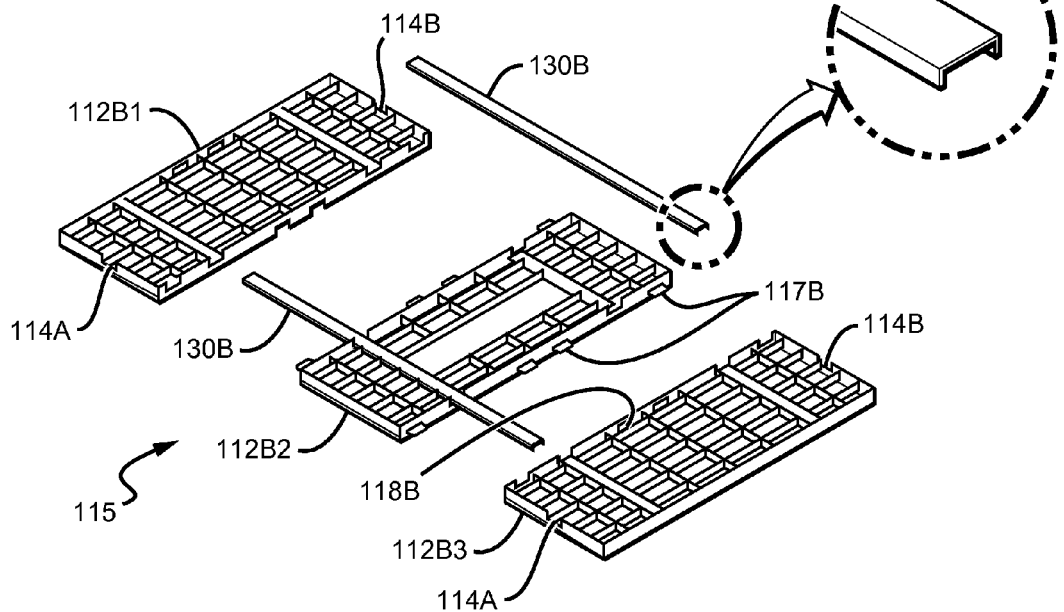
FIG. 9 is an exploded perspective view an embodiment of the platform of FIG. 1.
Figure 10:
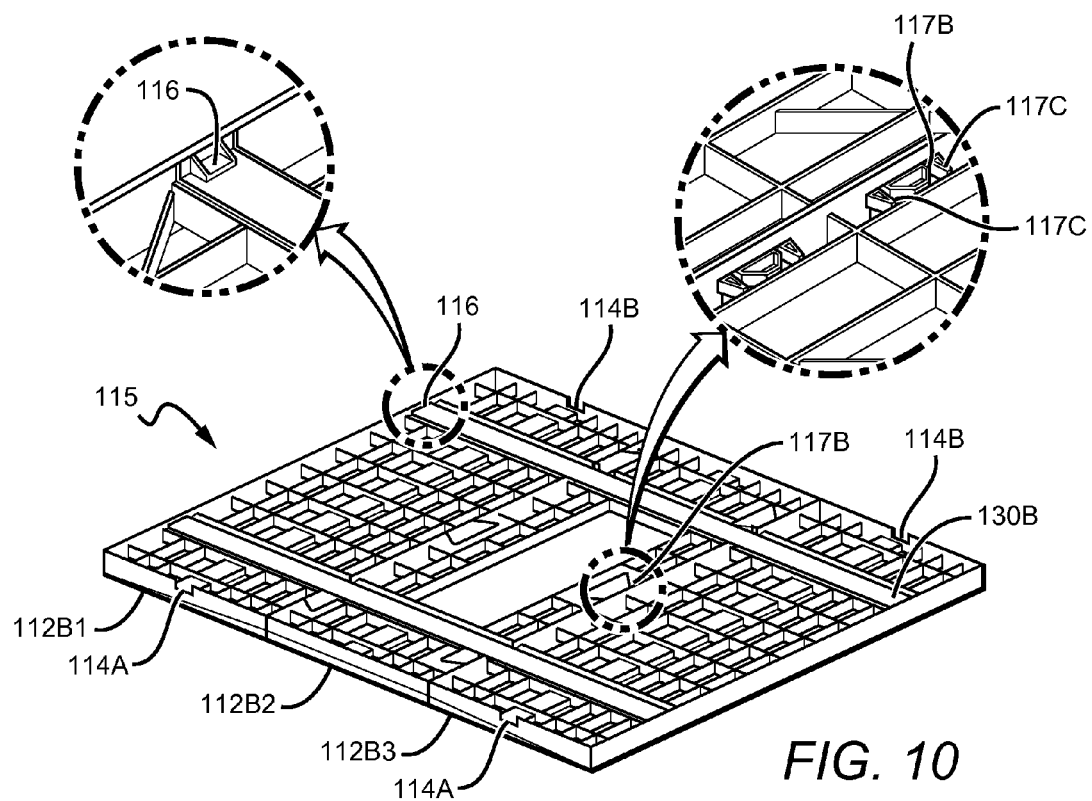
FIG. 10 is a non-exploded view of the platform of FIG. 9.

The segments 12A1-12A3 can be coupled in any suitable manner to each other, including simple juxtaposition, snap-fits, tongue and groove, and so forth. In FIGS. 1-3 the various segments are coupled using a snap-fit mechanism 16, in which the sides of one of an adjacent segments has a mating and interlocking male extension connector 17A, and the other one of an adjacent segment has a corresponding receiving area 18A. Another embodiment of coupler is shown in FIGS. 9-10. Regardless of the mechanism(s) used, it is preferred that the inter-segment couplings are user operable, meaning that a typical end-user can connect and disconnect adjacent segments with a minimum of effort, and most preferably without any tools.

Also shown in FIGS. 1-3, platforms 10A, 10B, and 10C are connected to the supports 40A, 40B, and 40C via a series of recesses 14A1-14A2, 14B1-14B2, and 14C1-14C2. Recesses 14A1-14A2 are preferably located orthogonally from the snap-fit mechanisms 16. Preferably, there are two recesses per each of the end segments, but depending on the configuration of the segments, there can be more or less recesses on a given segment to accommodate the supports. As used herein, recesses 14A1-14B1 can be a groove, a slot or any space that has a width and a depth to accommodate the width and the depth of supports 40A, 40B, or 40C or the width and the depth of adjuster 42 that is coupled to the supports, respectively for a secure and tight fit. The adjuster or supports can either be coupled to the recesses via a snap-fit mechanism. Regardless of the mechanism(s) used and whether segments 12A1 and 12C are coupled to supports 40B, or 40C or the adjuster 42, it is preferred that the inter-segment couplings are user operable, meaning that a typical end-user can connect and disconnect each platform and segments from the supports with a minimum of effort, and most preferably without any tools.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

To provide added stability, the segments 12A1-12A3 are preferably molded or otherwise constructed to include collinear channels on their undersides, which are sized and dimensioned to receive corresponding ones of the transverse supports 30A-30C. Segments advantageously have fingers 15 that cooperate to help hold the transverse supports to the corresponding segments.

From a marketing standpoint, one or more of the segments can have a logo 19. Also, while these Figures illustrate a platform having three segments, it should be appreciated that other quantities of segments can be combined to create a platform. Preferably, a platform is made by combining six segments.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

FIGS. 4-8 show a pair of longitudinally oriented supports 40A and four legs 20. Adjacent supports can be coupled in any suitable manner, but are here shown as being coupled using an adjuster 42. Preferably adjuster 42 can be an intervening pin or any length of a segment that couples to supports 40A so as to make the supports longer and more secure. Alternatively, the ends of adjacent supports could be coupled using a sleeve (not shown). To reduce noise and vibration one can also include a polymeric ring 44 about an end of one or more of the supports.

Each of legs 30 generally includes two telescoping members 32A, 32B. To reduce noise and vibration one can include another polymeric ring 36 about an end of one or more of the members 32A, 32B. Distal ends of legs 30 preferably have corner mount structures 34 to facilitate mounting of the legs to a ceiling, either by horizontally-driven or vertically-driven fastening means, including nails and screws. The legs 30 can advantageously include a finger operable detent 38 that cooperates with a catch 39 to fix a length of the leg 30. A security pin 37 can be used to lock the telescoping members 32A, 32B at a fixed length.

Legs 30 can be coupled to the platforms in any suitable manner. To provide significant strength and stability, legs 30 preferably include a channel through which extends the adjuster 42, or one or both of adjacent longitudinally oriented supports (not shown). A cap 46 can be used at the terminal end of a longitudinally oriented support or the adjuster 42.

FIGS. 9-10 show an embodiment of platform 115 having segments 112B1-112B3 that are coupled by snap-fit connectors, the snap-fit connector comprises male member 117B, and female member 118B. The male members 117B has user operable fingers 117C that can be biased by an user to disconnect the segments. In operation, a user would bias the fingers 117C towards each other, thereby enabling the exiting of male member 117B from female member 18B. Recesses 114A-114B located on the ends of segments 112B1 and 112B3 can connect the platform 115 to supports (not shown).

FIG. 9 shows another embodiment of the transverse support. Here, as oppose to a solid flat metal strip as shown in FIG. 2, transverse support 130B is made of sheet metal and has a cross-sectional configuration that enhances structural integrity. FIG. 9 shows a cross-section configuration similar to a "C." Other suitable shapes and configuration are also possible and is readily appreciated by one of ordinary skill in the art to provide structural integrity. The use of sheet metal is also advantageous in that sheet metal transverse support is lighter and easier to manufacture than a solid piece of metal strip.

In FIG. 10, transverse support 130B is secured in place by stop tab 116. Stop tab 116 is disposed on segments that receives the two ends of the transverse support. Here, the two ends of transverse support 130B is received by segments 112B1 and 112B3. Stop tab 116 is a protrusion preferably formed from the segments to keep the transverse support. The function of stop tab 116 is similar to that of finger 15 in FIG. 3.

Figure 11:
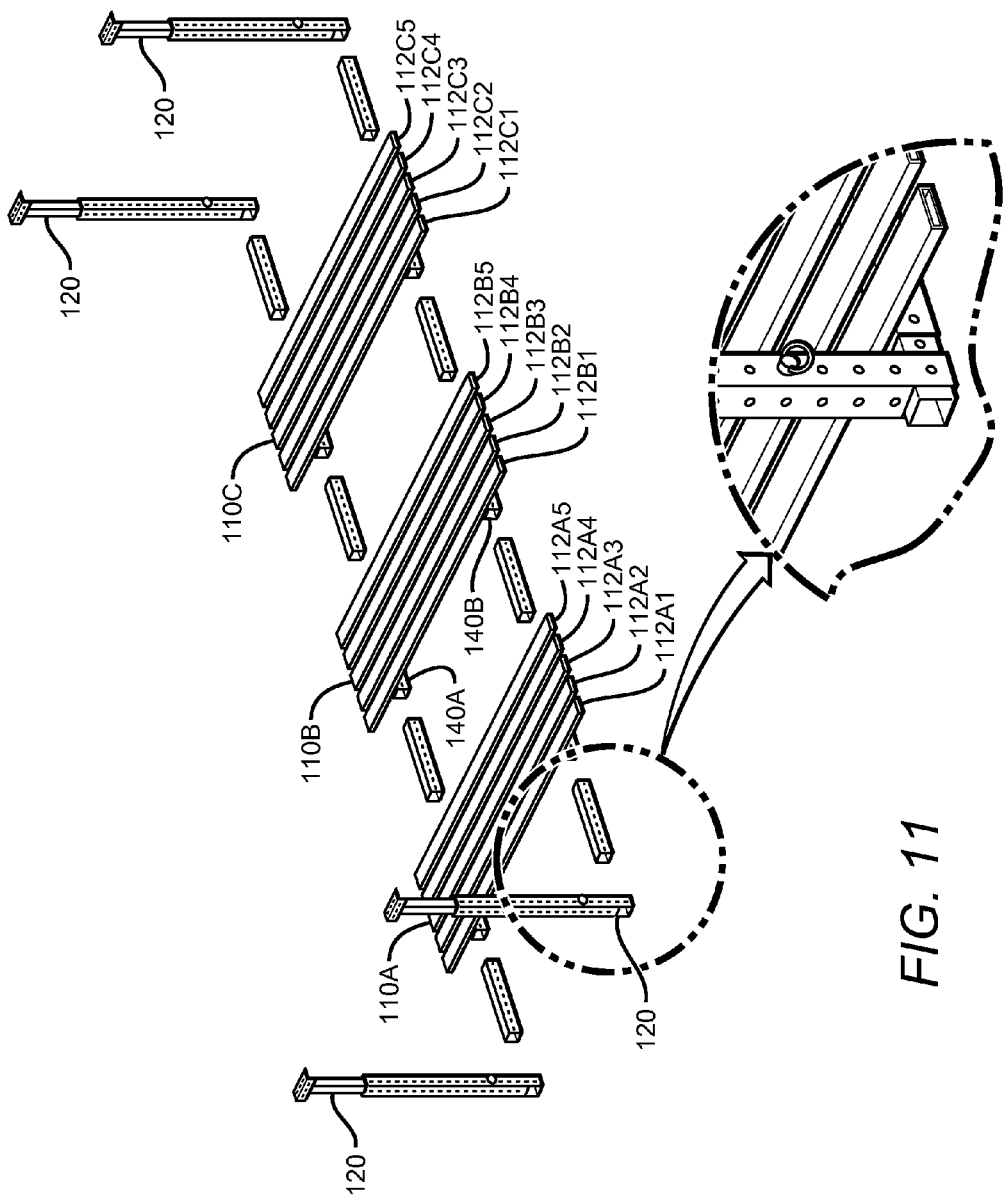
FIG. 11 is a perspective view of an alternative embodiment using aluminum slats instead of plastic platforms.

In FIG. 11, an alternative design of a storage rack 101, generally includes platforms 110A, 110B, and 110C, and legs 120. Each of the platforms 110A, 110B, and 110C comprises five slats 112A1-112A5 for platform 110A, 112B1-112B5 for platform 110B, 112C1-112C5 for platform 110C. There is a pair of longitudinally oriented supports 140A-140B running beneath all of the slats. The longitudinally oriented supports 140A-140B are held from above using legs 120.

The slats can comprise any suitable material, including especially aluminum or other metal, alloy, or composite. Although five appears experimentally to be an optimum number of slats, it is contemplated that one could have platforms with a greater of lesser number of slats than five, and indeed different platforms could have different numbers of slats. Where the slats contain metal, it is considered to be advantageous from weight and cost bases for the slats to be hollow, or to have "I", "C", "E", "H" or other cross-sections.

Thus, specific embodiments and applications of modular overhead storage have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. An overhead storage assembly, comprising:
a first platform having a plurality of segments wherein at least two of the plurality of segments include a plurality of grooves and a plurality of recesses, wherein the plurality of grooves are disposed orthogonally with respect to the plurality of recesses on each segment;
a plurality of extendable legs;
a plurality of transverse beams, wherein a first groove of the plurality of grooves receives at least a portion of a first transverse beam of the plurality of transverse beams; and
a plurality of longitudinal support beams, wherein a first recess of the plurality of recesses receives at least a portion of a first longitudinal support beam of the plurality of longitudinal support beams and wherein the plurality of longitudinal support beams are coupled to the plurality of extendable legs which together with the plurality of transverse beams provide suspension support for the first platform.

2. The assembly of claim 1, wherein the plurality of longitudinal support beams is disposed orthogonally with respect to the plurality of transverse beams.

3. The assembly of claim 1, wherein the plurality of longitudinal support beams is configured to snap fit within the plurality of recesses, respectively.

4. The assembly of claim 1, wherein the plurality of legs has telescoping components.

5. The assembly of claim 4, further comprising a detent that cooperates with a catch to fix a length of the telescoping components.

6. An overhead storage assembly, comprising:
a platform having a longitudinal dimension and a transverse dimension, comprising a plurality of segments wherein each segment couples to at least one adjacent segment;
first and second pairs of slots disposed on an underside surface of the platform;
at least one transverse channel disposed on the underside surface of the platform and oriented parallel to the transverse dimension;
first and second longitudinal beams sized and dimensioned to couple with the first and second pairs of slots, respectively, such that the first and second longitudinal beams are oriented parallel to the longitudinal dimension;
a transverse beam sized and dimensioned to couple with the at least one transverse channel; and
a plurality of legs that couple to the at least two longitudinal beams for suspending the platform.

7. The overhead storage assembly of claim 6, wherein the segments couple along an edge that is parallel to the longitudinal dimension.

8. The overhead storage assembly of claim 6, wherein the transverse beam is above the first and second longitudinal support beams when the platform is suspended.

9. The overhead storage assembly of claim 6, wherein the at least one transverse channel extends the entire transverse dimension of the platform.

10. The overhead storage assembly of claim 6, wherein each segment has at least one channel that aligns with a channel of an adjacently coupled segment to form at least a portion of the at least one transverse channel.

11. The overhead storage assembly of claim 6, wherein each of the first and second pairs of slots are disposed on opposite sides of a segment.

12. The overhead storage assembly of claim 6, further comprising a second transverse beam sized and dimensioned to couple with the at least one transverse channel.

13. The overhead storage assembly of claim 6, further comprising a second platform substantially similar to the first platform.

14. An overhead storage assembly, comprising:
first and second platforms each comprising at least two segments, wherein the at least two segments removably couple to each other;
a plurality of slots on each of the at least two segments;
first and second support beams sized and dimensioned to fit into the plurality of slots; and first and second legs sized and dimensioned to connect to the first and second support beams, respectively;

wherein each of the first and second legs has a mount structure for suspending the first and second platforms from a ceiling; and wherein the first and second segments couple along an edge that is parallel to the longitudinal dimension.

15. The overhead storage assembly of claim 14, further comprising at least one transverse channel disposed on an underside of the first platform and perpendicular to the first and second support beams.

16. The overhead storage assembly of claim 15, further comprising at least one transverse beam that couples with the at least one transverse channel upon assembly of the first platform.

17. The overhead storage assembly of claim 15, wherein the transverse beam is above the first and second support beams upon suspension of the first platform.

18. The overhead storage assembly of claim 14, wherein each of the first and second platforms further comprises a third segment that removably couples to both of the at least two segments.

* * * * *